United States Patent [19]

Martschin et al.

[11] Patent Number: 5,745,787
[45] Date of Patent: Apr. 28, 1998

[54] SYSTEM FOR INHIBITING BY AN AS YET NOT INITIALIZED PERIPHERAL EQUIPMENT THAT ADDRESSED BY PERMISSION SIGNAL TO FORWARD PERMISSION SIGNAL TO A FOLLOWING PERIPHERAL EQUIPMENT

[75] Inventors: Daniel Martschin, Bochum; Juergen Moschner, Dortmund, both of Germany

[73] Assignee: Siemens Aktiengesellschaft, Munich, Germany

[21] Appl. No.: 594,435

[22] Filed: Jan. 31, 1996

[30] Foreign Application Priority Data

Feb. 10, 1995 [DE] Germany ............... 195 04 488.6

[51] Int. Cl.$^6$ ............................................. G06F 15/40
[52] U.S. Cl. ................................................... 395/837
[58] Field of Search ........................ 395/821, 822, 395/823, 824, 825, 828, 829, 830, 835, 836, 837, 838, 839, 309, 310, 311

[56] References Cited

U.S. PATENT DOCUMENTS

| | | | |
|---|---|---|---|
| 3,836,889 | 9/1974 | Kotok et al. | 395/737 |
| 3,964,056 | 6/1976 | Charpentier et al. | 395/182.08 |
| 3,983,540 | 9/1976 | Keller et al. | 395/301 |
| 4,231,084 | 10/1980 | Yoshizaki et al. | 395/825 |
| 4,334,287 | 6/1982 | Wiedenman et al. | 395/856 |
| 4,538,224 | 8/1985 | Peterson | 395/842 |
| 4,594,705 | 6/1986 | Yahata et al. | 370/257 |
| 4,811,338 | 3/1989 | Haruyama et al. | 370/462 |
| 5,119,496 | 6/1992 | Nishikawa et al. | 395/742 |
| 5,359,717 | 10/1994 | Bowles et al. | 395/309 |

FOREIGN PATENT DOCUMENTS 38 23 914  1/1990  Germany.

OTHER PUBLICATIONS

Elektro–Anzeiger, vol. 46, No. 9, Sep. 1993, "Automatisches Daisy–Chain", pp. 62–63.
Electronic Design, Computer Systems Special Editorial Feature, Nov. 21, 1994, Allen M. Light, "Design a PCMCIA Add–In Card for the PCI Bus", pp. 140–146.

*Primary Examiner*—Moustafa M. Meky
*Attorney, Agent, or Firm*—Hill, Steadman & Simpson

[57] ABSTRACT

The method effects initialization of successively arranged peripheral equipment (PE1...PEn) that are connected in parallel via an interface (S) to a central equipment (ZE) of a communication system. An access permission signal (zs) is forwarded from peripheral equipment (PE1...PEn) to peripheral equipment (PE1...PEn). The as yet not initialized peripheral equipment (PE1...PEn) addressed by the access permission signal (zs) inhibits the forwarding of the access permission signal (zs) until the access of this peripheral equipment (PE1...PEn) to the interface (S), for accepting an address of the peripheral equipment (PE1...PEn), has been ended. The method enables a maximum configuration freedom with respect to the type and plurality of the peripheral equipment (PE1...PEn). An inoperative peripheral equipment (PE1...PEn) can additionally be localized and an initialization of all intact peripheral equipment (PE1...PEn) can ensue regardless of the position of the peripheral equipment (PE1...PEn) that has failed.

12 Claims, 1 Drawing Sheet

SYSTEM FOR INHIBITING BY AN AS YET NOT INITIALIZED PERIPHERAL EQUIPMENT THAT ADDRESSED BY PERMISSION SIGNAL TO FORWARD PERMISSION SIGNAL TO A FOLLOWING PERIPHERAL EQUIPMENT

BACKGROUND OF THE INVENTION

The present invention is directed to a method for initializing peripheral equipment that are connected to a central equipment in a communication system.

Communication systems are usually composed of a central equipment (for example, a microprocessor system) and of peripheral equipment (for example, sub-processor systems for facsimile or charge registration) whose plurality and type is configured dependent on the application of the communication system. The communication between the central equipment and the peripheral equipment ensues via interfaces that typically have data lines for reading and writing, lines for message signalling and lines for interrupt signalling. The peripheral equipment must be initialized at the commissioning of the system, and after an outage or after a restart.

Traditional communication systems implement the initialization in that the central equipment individually addresses the peripheral equipment upon utilization of individual connections thereof. Alternatively, only peripheral equipment of different type is connected to an initialization address line, so that the addressing remains individual. The general executive sequence of an initialization proceeds from the resetting to an initialization address shared in common by all peripheral equipment. The sequence comprises the individual addressing of a peripheral equipment via said initialization address line and, potentially, the answerback thereof to the central equipment and, subsequently, the allocation of an individual initialization address from the central equipment to the peripheral equipment via the data lines of the interface. Allen M. Light, "Design a PCMCIA Add-In Card for the PCI Bus", Electronic Design, 21 Nov., 1994, discloses a select device pin for the selection of an individual assembly. On the basis of its plug-in location, each assembly has an initial address, predetermined in circuit-oriented terms, allocated to it that can be reconfigured in program-oriented terms.

The plurality and type of connectable peripheral equipment remains limited for communication systems that initialize the peripheral equipment in this way, that is, the communication system cannot be arbitrarily expanded.

The article, "Automatic Daisy-Chain", elektro-anzeiger, Volume 46, No. 6, September 1993, pages 62–63, discloses that assembly cards have the right of use for a data bus or, respectively, for an interrupt allocated to them via a chain line and that this chain line is looped across all assembly cards. Respectively one of the assembly cards can thus be designationally addressed by a system controller card without employing address lines, insofar as a request therefor is present. This addressed assembly card subsequently communicates data via the data bus. However, a plurality of peripheral equipment cannot be initialized, that is be respectively assigned the individual addresses for a later addressing via address lines.

SUMMARY OF THE INVENTION

It is an object of the present invention to provide an improved method for initializing peripheral equipment such that an arbitrary plurality and type combination of peripheral equipment can be configured.

In general terms the present invention is a method for initializing peripheral equipment with a program-controlled central equipment of a communication system. The communication system has an interface for reading and writing data, for the synchronization of the peripheral equipment, for signalling a message, and for signalling an interrupt. The interface is connected parallel to all peripheral equipment. The peripheral equipment are successively arranged according to a priority chain with reference to an access permission signal. A peripheral equipment receiving the access permission signal evaluates the access permission signal and forwards it to the respectively following peripheral equipment dependent on the result of the evaluation. The at least one peripheral equipment, following an inquiry by the program-controlled central equipment, requests the initialization information the interface. The program-controlled central equipment offers an initialization information at the interface that identifies the peripheral equipment. The access permission signal is activated. An as yet not initialized peripheral equipment, addressed by the access permission signal, inhibits the forwarding of the access permission signal to the following peripheral equipment until the access of this peripheral equipment to the interface for accepting the initialization information has ended.

Advantageous developments of the present invention are as follows.

Following the enable of the access permission signal by the previously initialized peripheral equipment, the as yet not initialized peripheral equipment, respectively following in the priority chain, is initialized by the program-controlled central equipment in the same way without further influencing of the access permission signal.

For initialization of at least one peripheral equipment, the central equipment offers a general initialization address via the interface to all peripheral equipment, to which only reset peripheral equipment react. The as yet not initialized peripheral equipment addressed by an access permission signal signals the central equipment that it is ready to receive and inhibits the access permission signal for the following peripheral equipment. The central equipment offers an individual initialization address belonging to the peripheral equipment to be initialized to the peripheral equipment via the interface. This is read in by the peripheral equipment. The peripheral equipment subsequently forwards the access permission signal to the respectively following peripheral equipment.

Given initialization of all peripheral equipment, the central equipment offers the individual initialization address in the sequence of the peripheral equipment according to the priority chain. Given initialization of a signal reset peripheral equipment, the central equipment offers the appertaining, individual initialization address to the peripheral equipment.

For determining the blocking of the forwarding of the access permission signal, the central equipment offers a test address to the peripheral equipment via the interface. In response all peripheral equipment, wherein the access permission signal is not present, signal the non-presence to the central equipment via the interface. The central equipment subsequently communicates an individual initialization address to the blocked peripheral equipment in succession.

A plurality of peripheral equipment can be configured due to the introduction of an access permission signal that is successively supplied to all connected peripheral equipment according to a priority chain, that is the signal is not supplied in parallel as in the prior art method. So that only one peripheral equipment that is not yet initialized has access to the shared lines of the interface, the forwarding is inhibited from the respective peripheral equipment addressed by the access permission signal to the peripheral equipment following in the priority chain. Not only the plurality but also the type of connected peripheral equipment is selectable without limitation, that is peripheral equipment of the same type can be unproblematically configured. A further advantage of the inventive method is that a single line suffices in order to address all peripheral equipment during the initialization. This means additional savings in lines and terminals at the central equipment.

So that peripheral equipment that are down or inactive do not prevent the addressing of peripheral equipment having a lower priority, peripheral equipment that are down or inactive allow the access permission signal to pass to following peripheral equipment. A failure chain reaction upon failure of a peripheral equipment is thus prevented.

In case of a circuit-oriented error or, respectively, hardware fault of a peripheral equipment that blocks the forwarding of the access permission signal, an advantageous development of the inventive method provides a second general address, such as a test address. For determining the blockage of the forwarding of the access permission signal, the central equipment delivers a test address to the peripheral equipment via the interface. In response all peripheral equipment, at which the peripheral equipment is not present, signal the non-presence of the access permission signal to the central equipment via the interface. The central equipment then successively communicates an individual initialization address to the blocked peripheral equipment. All peripheral equipment that lie downstream of the peripheral equipment that failed in hardware terms in the priority chain can thus also be initialized. The central equipment can thus place all peripheral equipment, except the one that failed, into operational readiness.

Further advantageous developments with respect to an arrangement for the implementation of the disclosed initialization method are as follows. One embodiment for the evaluation or, respectively, control of the access permission signal by each peripheral equipment contains only a single logic element and two resistors, as a result whereof the additional circuit outlay for each peripheral equipment is reduced to a minimum.

In the arrangement the peripheral equipment are successively arranged according to a priority chain with reference to an access permission signal. A peripheral equipment receiving the access permission signal evaluates the access permission signal and forwards it to the respectively following peripheral equipment dependent on the result of the evaluation. The program-controlled central equipment is fashioned such that an initialization information that identifies the peripheral equipment is offered at the interface. Means are provided in the peripheral equipment so that the as yet not initialized peripheral equipment addressed by the access permission signal inhibits the forwarding of the access permission signal to the following peripheral equipment until the access of this peripheral equipment to the interface for accepting the initialization information has been ended.

In one embodiment a logic element belonging to each peripheral equipment has a first input connected to an output of a logic element of the preceding peripheral equipment carrying the incoming access permission signal and to an input of the peripheral equipment. The input is preset to a level that deviates from the active signal level of the access permission signal. A second input of the logic element is connected to an output of the peripheral equipment. The peripheral equipment can inhibit the outgoing access permission signal via the output. The output of the logic element that carries the outgoing access permission signal for the following peripheral equipment is connected to an input of the following peripheral equipment.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing and in which:

DESCRIPTION OF THE PREFERRED EMBODIMENTS

Figure 1:
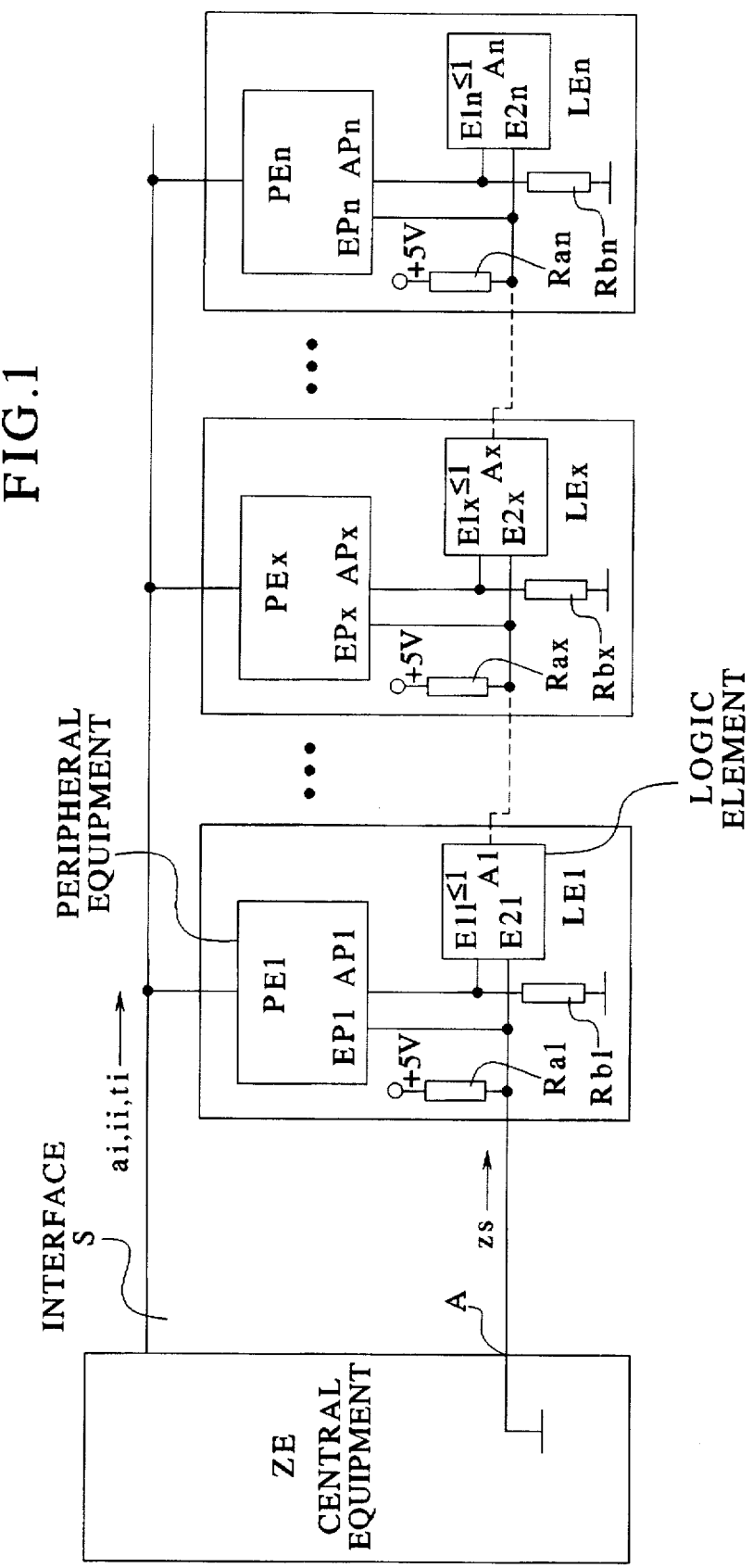
FIG. 1 is a block diagram depicting the present invention.

The data exchange between central equipment ZE and peripheral equipment PE1...PEn ensues via an interface S that provides lines arranged in parallel (not shown in detail) for reading and writing data, for synchronization of the peripheral equipment, for signalling a data exchange and for signalling an interruption. All peripheral equipment PE1...PEn are connected in parallel to the interface S.

An additional signal, the access permission signal zs, is provided for the initialization, that is the allocation of a respectively individual address ii with which the peripheral equipment PE1...PEn will be individually addressable during further operation of the communication system. This access permission signal zs is "0"-active and is formed in the central equipment ZE by constantly applying a zero potential to an output A. Each peripheral equipment PE1...PEn has a logic element LE1...LEn formed by an OR-gate that is allocated to it. A respectively first input E11...E1n of the logic element LE1...LEn is connected to a respective output A1...An of the logic element LE1...LEn−1 of the preceding peripheral equipment LE1...LEn−1 and to an input EP1...EPn of the peripheral equipment PE1...PEn. The input E11 at the first peripheral equipment PE1 is connected to the output A of the central equipment ZE wherein a "0" level is applied to the output A. Additionally, the respectively first input E11...E1n is preset to an operating voltage of +5 V via a respective resistor Ra1...Ran. A respectively second input E21...E2n of the logic elements LE1...LEn is respectively connected to an output AP1...APn of the peripheral equipment PE1...PEn and to "0" potential via a respective resistor Rb1...Rbn. The resistors, for example, have a nominal value of 10 k Ω. The output An of the logic element LEn of the n$^{th}$ peripheral equipment PEn is unwired.

The basic functioning of the logic elements LE1...LEn together with the peripheral equipment PE1...n and, subsequently, the initialization are set forth below with reference to the x$^{th}$ peripheral equipment PEx by way of example for all peripheral equipment PE1...PEn.

The presence of the access permission signal zs is recognized by the allocated peripheral equipment PEx and the allocated logic element LEx. When the incoming access permission signal is active ("0" potential) and when the peripheral equipment PEx does not affect an inhibit of the access permission signal zs, (that is, when the peripheral equipment PEx outputs a potential representing a binary "0" at the output APx), then the access permission signal zs is forwarded (a potential representing a binary "0" consequently pends at the output of the logic element LEx). For inhibiting the access permission signal zs for the following peripheral equipment PEx+1...PEn, a potential representing a binary "1" is applied to the output APx in the peripheral equipment PEx, this potential thus also pending at the output Ax of the logic element LEx. This processing of the access permission signal zs by the peripheral equipment PEx thus assures that no influencing, that is potential blockage, of the signal occurs when the peripheral equipment PEx has failed or is inactive. This is possible in this case since the resistor Rbx presets the first input E1x of the logic element LEx to "0" potential, and a passing of the access permission signal zs through the "down" peripheral equipment PEx.

The initialization sequences in the following manner. After the resetting of all peripheral equipment PE1...PEn or even after a resetting of only one peripheral equipment PE1...PEn, the reset peripheral equipment PE1...PEn can be addressed via the general initialization address ai. The selection of an individual, reset, that is not yet initialized peripheral equipment PE1...PEn (the $x^{th}$ peripheral equipment in the exemplary embodiment) is thus only possible with using the access permission signal zs. The access permission signal zs, that is normally constantly through-connected from peripheral equipment to peripheral equipment, is first inhibited by all peripheral equipment PE1...PEn during the initialization and is then in turn enabled by the peripheral equipment PE1...PEn that have already been initialized. After the peripheral equipment PEx to be currently initialized, the access permission signal zs remains inhibited for the respectively following peripheral equipment PEx+1...PEn.

After the general initialization address ai has been applied to the interface S by the central equipment ZE and after the standard, accompanying message signalizations, all reset peripheral equipment PE1...PEn respond. Each addressed peripheral equipment PE1...PEn thereby inhibits the forwarding of the access permission signal zs. According to the priority chain, the access permission signal is only present at peripheral equipment whose previous peripheral equipment PEx-1 were already initialized or, respectively, forwarded the access permission signal. The peripheral equipment PEx is consequently the only peripheral equipment PE1...PEn that signals readiness to receive to the central equipment ZE via the interface S and that accepts the individual initialization address ii sent by the central equipment ZE in the next cycle and intended for the peripheral equipment PEx. After reception of the individual initialization address ii, the newly initialized peripheral equipment PEx forwards the access permission signal zs to the following peripheral equipment PEx+1...PEn. The initialization of the following peripheral equipment PEx+1...PEn ensues in an analogous manner. All peripheral equipment PE1...PEn are initialized when no peripheral equipment PE1...PEn reacts to the general initialization address ai. The central equipment ZE must thereby undertake the selection of the proper sequence of the individual initialization addresses 11 corresponding to the sequence of the peripheral equipment PE1...PEn or, respectively, the localization of an individual peripheral equipment PEx to be initialized and determination by its individual initialization address.

Further control functions use the access permission signal zs in conjunction with the initialization. For localizing a faulty peripheral equipment, for example the xth peripheral equipment PEx that has failed due to hardware faults, the central equipment outputs a test address ti. The test address ti is acknowledged via the interface S by the peripheral equipment PEx+1...PEn that are reset and for which there is no access permission signal zs. The access permission signal zs is not present in the peripheral equipment PEx+1...PEn that follow the faulty peripheral equipment PEx. Respectively one output of the peripheral equipment PE1...PEn that is connected to the write line (for the peripheral equipment PE1...PEn) belonging to the interface S is fashioned as a transistor circuit with an open collector. Each peripheral equipment PE1...PEn thus acknowledges a "1" potential via this output, insofar as a "0" potential is not explicitly applied by a peripheral equipment PE1...PEn. The central equipment ZE can thus recognize the presence of an acknowledge of the test address ti with a "0" potential by a peripheral equipment PE1...PEn despite peripheral equipment PE1...PEn that have malfunctioned. The central equipment ZE determines the faulty peripheral equipment PEx from the plurality of peripheral equipment PE1...PEx-1 already initialized. Subsequently, the central equipment ZE starts the initialization of the peripheral equipment PEx+1...PEn beginning with the peripheral equipment PEx+1 following the faulty peripheral equipment PEx.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for initializing peripheral equipments with a program-controlled central equipment of a communication system having an interface for reading and writing data, for synchronization of the peripheral equipment, for signalling a message, and for signalling an interrupt, the interface connected in parallel to all of said peripheral equipments, comprising the steps of:

arranging the peripheral equipments in succession according to a priority chain with reference to an access permission signal;

evaluating the access permission signal in a respective peripheral equipment, that receives the access permission signal, and forwarding the access permission signal to a respective following peripheral equipment dependent on a result of the evaluation;

requesting by at least one peripheral equipment, following an inquiry by the program-controlled central equipment, initialization information via the interface;

offering by the program-controlled central equipment initialization information at the interface that identifies said at least one peripheral equipment;

activating the access permission signal; and inhibiting by an as yet not initialized peripheral equipment, that is addressed by the access permission signal, forwarding of the access permission signal to a following peripheral equipment until the access of said at least one peripheral equipment to the interface for accepting the initialization information has ended.

2. The method according to claim 1, wherein, following an enable of the access permission signal by a previously initialized peripheral equipment, an as yet not initialized peripheral equipment that follows in the priority chain, is initialized by the program-controlled central equipment in the same manner without affecting of the access permission signal.

3. The method according to claim 1, wherein, for initialization of said at least one peripheral equipment, the central equipment offers a general initialization address via the interface to all of the peripheral equipments, to which only reset peripheral equipment react;

wherein an as yet not initialized reset peripheral equipment addressed by an access permission signal signals the central equipment that said as yet not initialized reset peripheral equipment is ready to receive and inhibits the access permission signal to a following reset peripheral equipment;

wherein the central equipment offers an individual initialization address of said reset peripheral equipment to be initialized to said reset peripheral equipment via the interface, said individual initialization address being read by said reset peripheral equipment; and wherein said reset peripheral equipment subsequently forwards the access permission signal to said following peripheral equipment.

4. The method according to claim 3, wherein given initialization of all peripheral equipments, the central equipment offers the individual initialization address in the sequence of the peripheral equipments according to the priority chain; and wherein given initialization of the reset peripheral equipment, the central equipment offers the associated, individual initialization address to the reset peripheral equipment.

5. The method according to claim 1, wherein the access permission signal (inactive) passes through (inactive) or inoperative peripheral equipment.

6. The method according to claim 1, wherein for determining the inhibiting of the forwarding of the access permission signal, the central equipment offers a test address to the peripheral equipment via the interface, whereupon peripheral equipment, in which the access permission signal is not present, signal a non-presence to the central equipment via the interface; and wherein the central equipment communicates an individual initialization address to the peripheral equipment, which signalled a non-presence in succession.

7. An arrangement for initializing peripheral equipments with a program-controlled central equipment of a communication system comprising:

an interface for reading and writing data, for synchronization of the peripheral equipments, for signalling a message, and for signalling an interrupt, said interface connected to said central equipment and connected in parallel to all of said peripheral equipments;

the peripheral equipments arranged in succession according to a priority chain with reference to an access permission signal, a peripheral equipment receiving the access permission signal evaluating the access permission signal and forwarding the access permission signal to a following peripheral equipment dependent on the evaluation;

initialization information that is offered at the interface by the program-controlled central equipment and that identifies a respective peripheral equipment; and each of the peripheral equipment respectively having a device so that an as yet not initialized peripheral equipment addressed by the access permission signal inhibits forwarding of the access permission signal to a following peripheral equipment until access of said as yet not initialized peripheral equipment to the interface for accepting the initialization information has ended.

8. The arrangement according to claim 7, wherein said device is a logic element having a first input connected to an output of a logic element of a preceding peripheral equipment carrying an incoming access permission signal and to an input of its respective peripheral equipment, the first input being preset to a level that deviates from an active signal level of the access permission signal; and wherein the logic element has a second input connected to an output of the respective peripheral equipment, whereby the respective peripheral equipment can inhibit an outgoing access permission signal via the output of the peripheral equipment; and the logic element having an output that carries the outgoing access permission signal for a following peripheral equipment, said output of the logic element connected to an input of the following peripheral equipment.

9. A method for initializing peripheral equipments with a program-controlled central equipment of a communication system having an interface for reading and writing data, for synchronization of the peripheral equipments, for signalling a message, and for signalling an interrupt, the interface connected in parallel to all of said peripheral equipments, comprising the steps of:

arranging the peripheral equipments in succession according to a priority chain with reference to an access permission signal;

evaluating the access permission signal in a respective peripheral equipment, that receives the access permission signal, and forwarding the access permission signal to a respective following peripheral equipment dependent on a result of the evaluation;

requesting by at least one peripheral equipment, following an inquiry by the program-controlled central equipment, initialization information via the interface;

offering by the program-controlled central equipment initialization information at the interface that identifies said at least one peripheral equipment;

activating the access permission signal;

inhibiting by an as yet not initialized peripheral equipment, that is addressed by the access permission signal, forwarding of the access permission signal to a following peripheral equipment until the access of said at least one peripheral equipment to the interface for accepting the initialization information has ended;

for initialization of said at least one peripheral equipment, the central equipment offers a general initialization address via the interface to all of the peripheral equipments, to which only reset peripheral equipment react;

an as yet not initialized reset peripheral equipment addressed by an access permission signal signals the central equipment that said as yet not initialized reset peripheral equipment is ready to receive and inhibits the access permission signal to a following reset peripheral equipment;

the central equipment offers an individual initialization address of said reset peripheral equipment to be initialized to said reset peripheral equipment via the interface, said individual initialization address being read by said reset peripheral equipment; and said reset peripheral equipment subsequently forwards the access permission signal to said following peripheral equipment.

10. The method according to claim 9, wherein given initialization of all peripheral equipments, the central equipment offers the individual initialization address in the sequence of the peripheral equipments according to the priority chain; and wherein given initialization of the reset peripheral equipments, the central equipment offers the associated, individual initialization address to the reset peripheral equipments.

11. The method according to claim 9, wherein the access permission signal (inactive) passes through (inactive) or inoperative peripheral equipment.

12. The method according to claim 9, wherein for determining the inhibiting of the forwarding of the access permission signal, the central equipment offers a test address to the peripheral equipment via the interface, whereupon peripheral equipment, in which the access permission signal is not present, signal a non-presence to the central equipment via the interface; and wherein the central equipment communicates an individual initialization address to the peripheral equipment, which signalled a non-presence in succession.

* * * * *